Patented Dec. 15, 1953

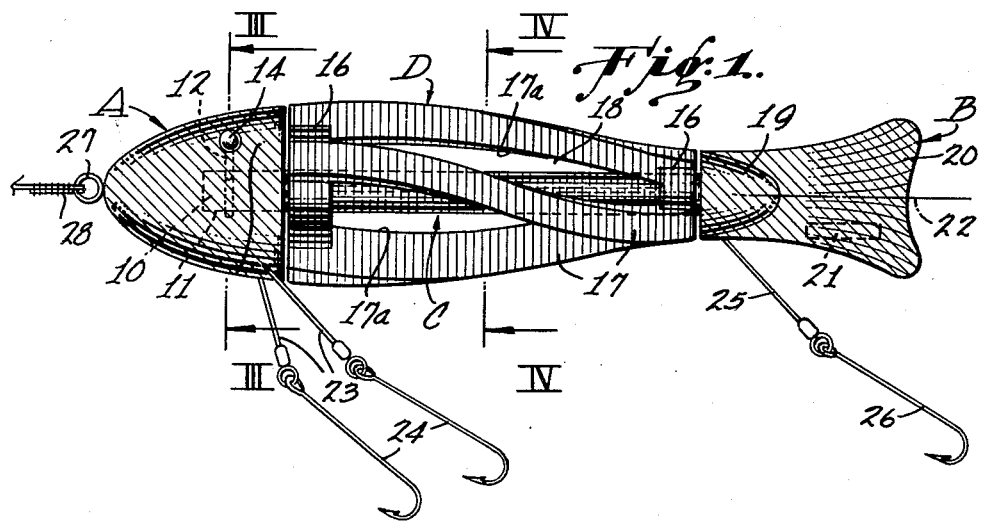
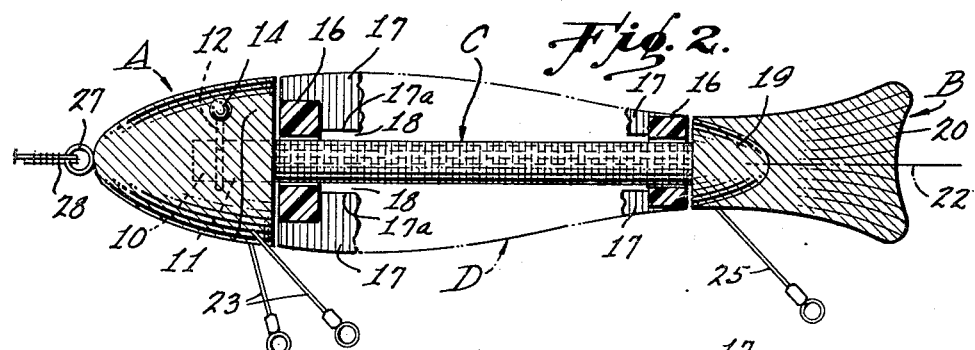
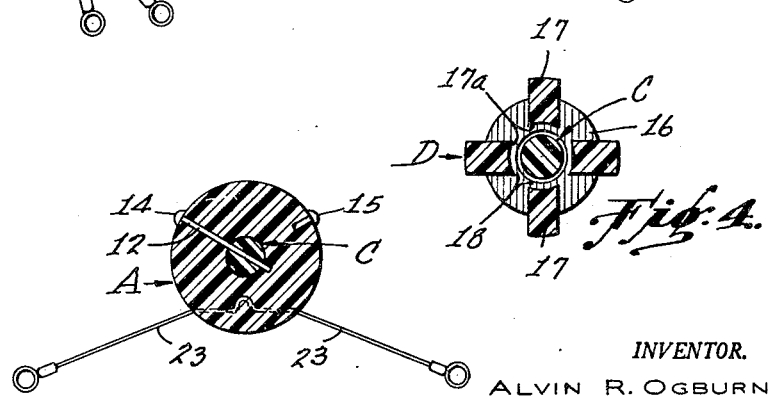
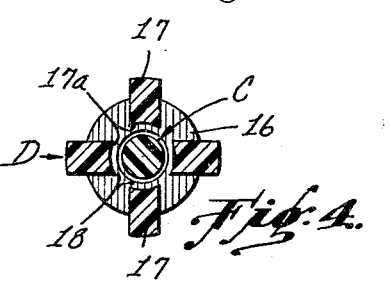

2,662,330

UNITED STATES PATENT OFFICE 2,662,330

FISH LURE

Alvin R. Ogburn, Crescent City, Calif.

Application July 7, 1950, Serial No. 172,443

2 Claims. (Cl. 43—42.16)

The present invention relates to improvements in a fish lure. It consists of the combinations, constructions and arrangement of parts, as hereinafter described and claimed.

An object of this invention is to provide a fish lure having a rotor forming the body of the lure. The rotor includes helical blades, which are adapted to turn the rotor as the lure is moved through water. During the rotation of the rotor, the water will be agitated, serving to attract the fish thereto.

Moreover, the rotor is journalled on a shaft that interconnects the head and tail sections of the lure. The blades of the rotor are spaced apart to expose the shaft to exterior view. The rotor and shaft are contrasted in color, and thus the blades will appear to move along the shaft as the rotor is turned.

As a further object of the invention, I provide a fish lure that is well balanced, thus maintaining the lure on an even keel as it is advanced through the water. Furthermore, the lure is weighted on its underneath side to preclude the lure from turning upside down during use.

Another object is to provide a fish lure that is simple in construction, easily assembled, and relatively cheap to manufacture, while still producing an attractive article.

Other objects and advantages will appear as the specification continues. The novel features of the invention will be set forth in the claims hereunto appended.

Drawing

For a better understanding of this invention, reference should be had to the accompanying drawing, forming part of this application, in which:

Figure 1 is a side elevational view of my improved fish lure;

Figure 2 is a similar view, but discloses parts of the rotor broken away to illustrate the interior construction;

Figures 3 and 4 are transverse vertical sectional views taken along the planes III—III and IV—IV, respectively, of Figure 1.

While I have shown only the preferred form of my invention, it should be understood that various changes, or modifications, may be made within the scope of the annexed claims without departing from the spirit thereof.

Detailed description

Referring to the drawing, I provide a fish lure having head and tail sections A and B, respectively, which are arranged in spaced-apart and axial relation with one another. These sections are interconnected by a shaft C extending axially of the lure. Upon this shaft is journalled a rotor D to provide the main body of the lure.

As shown, the shaft C is formed integral with the tail section B. The forward end 10 of this shaft is telescoped into a bore 11 extending inwardly into the head section A. A pin 12 is provided for securing the end 10 of the shaft to the head section. This pin has a head 14 fashioned to resemble one eye for the lure, its other eye being indicated at 15.

In its structural features, the rotor D includes a pair of hubs 16, which are rotatably disposed on the shaft C adjacent to the head and tail sections A and B, respectively. The rotor further includes spaced-apart helical blades 17 that are affixed to the hubs 16 to extend between the head and tail sections, as clearly shown in Figure 1. The blades are formed with reverse curves extending longitudinally of the lure. As the lure is moved through a body of water, the blades will cause the rotor to turn.

Particular attention is called to the fact that the inner edges 17a of the blades are spaced from the shaft C, providing passageways 18 through which the water may pass freely. Thus the water in the region of the rotor will be agitated during turning of the rotor, serving to attract the fish thereto.

The tail section B has a conical portion 19 in which the shaft C is anchored, and further defines a rudder-like fin 20 at the trailing end of the lure. A weight 21 (see Figure 1) is provided in the tail section below the longitudinal axis 22 of the lure. The purpose of this weight is to overcome any tendency of the lure to turn upside down as it is advanced through the water.

As shown in the drawings, and particularly in Figures 1 and 2, the rear side of the head sections, which might be termed a base, faces or confronts the forward side or base of the tail section. Each of the confronting bases has or defines a peripheral rim. The head and tail sections, together with the shaft coacts to define a circumferential groove encircling the shaft. The blades extend the entire distance between the bases and each blade has an outermost longitudinal edge whose opposing ends are disposed adjacent to the peripheral rims of the head and tail sections, respectively. The blades will thus, when rotated, provide a fish body representation for the lure bridging between the head and tail section.

At the forward portion of the lure, a wire 23 is embedded in the head A so that the wire will not turn relative to the head. Hooks 24 are attached to the opposite ends of this wire. As shown in Figure 3, the wire 23 projects laterally beyond opposing sides of the head section A in a downwardly-sloping direction and is positioned below the longitudinal axis of the lure. The weights of the hooks 24 and the wire sections themselves aid in holding the lure in a horizontal position, preventing the lure from turning upside down. The end sections of the wire 23 serve as outriggers for steadying the head sections.

It will be noted further that a wire 25 has its upper end embedded in the tail section B, while the lower end of this wire has a hook 26 fastened thereto.

For the purpose of drawing the lure through the water, I have shown an eyelet 27 secured to the nose of the head section; and a line 28 is fastened to this eyelet.

The head and tail sections A and B, respectively, the shaft C and the rotor D may be made from suitably-colored plastic. As color-shaded in the drawing, the head and tail sections have been shown as being green, the shaft C as yellow, and the rotor D as red. Of course, I do not wish to be limited to these particular colors.

With particular reference to Figures 1 and 4, it will be apparent that the shaft C is viewable through the spaces provided between the helical blades 17. As the rotor D is turned, the blades will have the appearance of moving along the shaft. This effect is accentuated due to the contrasting colors existing between the rotor and shaft.

The head of the lure may be made slightly heavier than the remainder of the lure so as to overcome any tendency for the lure to rise in the water due to a slight up-pull on the line 28.

*Summary of operation*

The operation of my improved fish lure is summarized briefly as follows:

Assuming that the line 28 is secured to the head section A by the eyelet 27, and that the lure is being pulled through the water, the latter will impinge upon the blades 17 of the rotor D, causing the rotor to turn around the shaft C.

This will produce two effects tending to attract the fish: Firstly, the contrasting colors existing between the shaft C and the rotor D will create the impression of the blades 17 moving along the shaft. Secondly, the escapement of the water through the passageways 18 will cause an agitation or churning of the water, causing bubbling and sparkling of the water.

Since the outermost longitudinal edge of each blade blends into the outer surfaces of the head and tail sections without interruption, a simulated fish representation extending from end to end of the lure is provided during rotation of the blades.

The outrigger effect produced by the wire 23 and its hooks 24 at the forward portion of the lure below the longitudinal axis 22 of the lure, and the weight 21 in the tail section, will overcome any tendency of the lure to turn upside down.

I claim:

1. In a fish lure: spaced-apart head and tail sections arranged in axial relation with one another; these sections having bases of substantially circular cross-section facing each other; a shaft mounted axially of the lure and interconnecting the head and tail sections; these sections and the shaft coacting to define a circumferential groove encircling the shaft, with the width of the groove extending between the head and tail sections; a rotor mounted within the confines of this groove, and being journalled for turning on the shaft; the rotor including helical blades extending substantially from the head to the tail section, and fashioned to turn the rotor as the lure is advanced through a body of water; each blade having an outermost longitudinal edge whose end sections are disposed substantially flush with the peripheries of the circular bases of the head and tail sections, respectively, the blades when rotating providing a fish body representation for the lure bridging between the head and tail sections the blades being spaced from each other, with inner longitudinal edges of the blades spaced from the shaft, providing passageways through which the water may pass with an agitating action to attract fish.

2. In a fish lure, spaced-apart head and tail sections arranged in axial relation with one another, these sections having confronting bases, each defining a peripheral rim, a shaft mounted axially of the lure, and interconnecting the head and tail sections, these sections and the shaft coacting to define a circumferential groove encircling the shaft, a rotor mounted in this groove, and being journaled for turning on the shaft, the rotor including a plurality of helical blades spaced one from the other, and extending substantially the entire distance between the bases of the head and tail sections, these blades being fashioned to turn the rotor as the lure is advanced through water, each blade having an outermost longitudinal edge whose opposing ends are disposed adjacent to the peripheral rims of the bases of the head and tail sections, respectively, the blades when rotating providing a fish body representation for the lure bridging between the head and tail sections, the head section tapering forwardly from its base to define a nose, the tail section flaring outwardly to the rear of its base to define a caudal fin, the outermost longitudinal edge of each blade being formed with a reverse curve blending into the outer surfaces of the head and tail sections substantially without interruption, thereby providing during rotation of the blades a simulated fish representation extending from end to end of the lure.

ALVIN R. OGBURN.

References Cited in the file of this patent

UNITED STATES PATENTS

| Number | Name | Date |
| --- | --- | --- |
| 990,984 | Immell | May 2, 1911 |
| 1,725,636 | Heaslip | Aug. 20, 1929 |
| 1,993,868 | Thornberg | Mar. 12, 1935 |
| 2,258,080 | Thomas et al. | Oct. 7, 1941 |
| 2,378,370 | Van Buren | June 12, 1945 |
| 2,437,549 | Pecher | June 8, 1948 |
| 2,472,639 | Wickens | June 7, 1949 |
| 2,493,431 | Wold | Jan. 3, 1950 |

FOREIGN PATENTS

| Number | Country | Date |
| --- | --- | --- |
| 612,352 | France | Oct. 22, 1926 |
| 722,798 | France | Mar. 25, 1932 |
| 829,511 | France | June 29, 1938 |